(12) United States Patent
Kang et al.

(10) Patent No.: US 10,294,387 B2
(45) Date of Patent: May 21, 2019

(54) HARD COATING FILM

(71) Applicant: LG CHEM, LTD., Seoul (KR)

(72) Inventors: Joon Koo Kang, Daejeon (KR); Yeong Rae Chang, Daejeon (KR); Jae Hoon Shim, Daejeon (KR); Sung Don Hong, Daejeon (KR); Seung Jung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/404,110

(22) PCT Filed: May 31, 2013

(86) PCT No.: PCT/KR2013/004804
§ 371 (c)(1),
(2) Date: Nov. 26, 2014

(87) PCT Pub. No.: WO2013/180509
PCT Pub. Date: Dec. 5, 2013

(65) Prior Publication Data
US 2015/0132552 A1  May 14, 2015

(30) Foreign Application Priority Data

May 31, 2012 (KR) .................. 10-2012-0058634
May 31, 2012 (KR) .................. 10-2012-0058635
May 31, 2012 (KR) .................. 10-2012-0058636
May 31, 2012 (KR) .................. 10-2012-0058637
May 30, 2013 (KR) .................. 10-2013-0062124

(51) Int. Cl.
| | |
|---|---|
| *B32B 7/02* | (2019.01) |
| *C09D 135/02* | (2006.01) |
| *G02B 1/14* | (2015.01) |
| *C09D 7/48* | (2018.01) |
| *C09D 7/61* | (2018.01) |
| *C09D 133/04* | (2006.01) |
| *G02B 1/10* | (2015.01) |
| *C08K 5/3475* | (2006.01) |
| *C09D 105/16* | (2006.01) |
| *C09D 133/14* | (2006.01) |
| *C09D 167/00* | (2006.01) |
| *C08J 7/04* | (2006.01) |
| *B05D 3/06* | (2006.01) |
| *C09D 4/00* | (2006.01) |
| *C08J 5/18* | (2006.01) |
| *C08K 3/36* | (2006.01) |
| *C08K 3/22* | (2006.01) |

(52) U.S. Cl.
CPC .......... *C09D 135/02* (2013.01); *B05D 3/067* (2013.01); *C08J 5/18* (2013.01); *C08J 7/04* (2013.01); *C08J 7/042* (2013.01); *C08J 7/047* (2013.01); *C08K 5/3475* (2013.01); *C09D 4/00* (2013.01); *C09D 7/48* (2018.01); *C09D 7/61* (2018.01); *C09D 105/16* (2013.01); *C09D 133/04* (2013.01); *C09D 133/14* (2013.01); *C09D 167/00* (2013.01); *G02B 1/10* (2013.01); *G02B 1/105* (2013.01); *G02B 1/14* (2015.01); *C08J 2301/12* (2013.01); *C08J 2367/02* (2013.01); *C08J 2433/14* (2013.01); *C08J 2435/02* (2013.01); *C08K 3/36* (2013.01); *C08K 2003/2227* (2013.01); *C08K 2003/2241* (2013.01); *C08K 2003/2296* (2013.01); *C08K 2201/005* (2013.01); *C08K 2201/011* (2013.01); *Y10T 428/2495* (2015.01); *Y10T 428/259* (2015.01); *Y10T 428/269* (2015.01); *Y10T 428/31507* (2015.04); *Y10T 428/31797* (2015.04); *Y10T 428/31884* (2015.04); *Y10T 428/31928* (2015.04)

(58) Field of Classification Search
CPC ............... C08J 2363/02; C08J 2367/02; C08J 2433/08; C08J 2435/02; C08J 7/042; C08J 7/047; Y10T 428/2495; Y10T 428/259; Y10T 428/269; Y10T 428/31507; Y10T 428/31797; Y10T 428/31884; Y10T 428/31928
See application file for complete search history.

(56) References Cited

U.S. PATENT DOCUMENTS

| | | | |
|---|---|---|---|
| 4,902,578 | A | 2/1990 | Kerr, III |
| 6,245,833 | B1 | 6/2001 | Kang et al. |
| 6,489,015 | B1 | 12/2002 | Tsuchiya et al. |
| 7,622,055 | B2 | 11/2009 | Nakano et al. |
| 2003/0008162 | A1 | 1/2003 | Oya et al. |
| 2004/0081831 | A1 | 4/2004 | Shoshi et al. |
| 2004/0135159 | A1 | 7/2004 | Siegel |

(Continued)

FOREIGN PATENT DOCUMENTS

| | | |
|---|---|---|
| CN | 1558824 A | 12/2004 |
| CN | 1611968 A | 5/2005 |

(Continued)

OTHER PUBLICATIONS

Search Report issued in International Application No. PCT/KR2013/004809 dated Aug. 12, 2013, 5 pages.
Search Report issued in International Application No. PCT/KR2013/004804 dated Aug. 19, 2013, 5 pages.
Search Report issued in International Application No. PCT/KR2013/004805 dated Aug. 22, 2013, 5 pages.
Search Report issued in International Application No. PCT/KR2013/004798 dated Aug. 28, 2013, 6 pages.
Search Report issued in International Application No. PCT/KR2013/004807 dated Sep. 4, 2013, 7 pgs.
Search Report issued in International Application No. PCT/KR2013/004812, dated Sep. 12, 2013, 6 pages.
Extended European Search Report dated Mar. 11, 2016, issued in European Patent Application No. 13830272.4, 7 pages.
Extended European Search Report dated Mar. 14, 2016, issued in European Patent Application No. 13830709.5, 9 pages.

(Continued)

*Primary Examiner* — Lawrence D Ferguson
(74) *Attorney, Agent, or Firm* — Rothwell, Figg, Ernst & Manbeck, P.C.

(57) ABSTRACT

The present invention provides a hard coating film having high hardness and excellent properties. The hard coating film has high hardness and is not easily curled.

15 Claims, No Drawings

(56) References Cited

U.S. PATENT DOCUMENTS

| | | | |
|---|---|---|---|
| 2005/0136252 A1 | 6/2005 | Chisholm et al. | |
| 2005/0136273 A1 | 6/2005 | Hashimoto et al. | |
| 2006/0134400 A1 | 6/2006 | Takada et al. | |
| 2006/0234035 A1 | 10/2006 | Wang et al. | |
| 2006/0286383 A1 | 12/2006 | Gilmer | |
| 2007/0178297 A1 | 8/2007 | Takada et al. | |
| 2007/0231566 A1 | 10/2007 | Yoneyama et al. | |
| 2007/0237966 A1 | 10/2007 | Takao et al. | |
| 2008/0145673 A1 | 6/2008 | Bonnard | |
| 2008/0193722 A1 | 8/2008 | Tanaka | |
| 2008/0218666 A1* | 9/2008 | Toyooka | G02F 1/133528 349/96 |
| 2008/0257216 A1 | 10/2008 | Ravyst | |
| 2008/0311351 A1 | 12/2008 | Hsu et al. | |
| 2009/0169896 A1 | 7/2009 | Sohn et al. | |
| 2009/0214871 A1 | 8/2009 | Fukuda et al. | |
| 2009/0301561 A1 | 12/2009 | Wang et al. | |
| 2010/0084037 A1 | 4/2010 | Ericsson et al. | |
| 2010/0124631 A1 | 5/2010 | Horio et al. | |
| 2010/0124656 A1 | 5/2010 | Horio et al. | |
| 2010/0167068 A1 | 7/2010 | Horio | |
| 2011/0050623 A1 | 3/2011 | Lee et al. | |
| 2011/0124823 A1 | 5/2011 | Hayashi et al. | |
| 2012/0019766 A1 | 1/2012 | Oki et al. | |
| 2012/0034450 A1 | 2/2012 | Morita et al. | |
| 2012/0128890 A1 | 5/2012 | Mirchev | |
| 2014/0079937 A1 | 3/2014 | Jung et al. | |
| 2015/0299507 A1 | 10/2015 | Kang et al. | |

FOREIGN PATENT DOCUMENTS

| | | |
|---|---|---|
| CN | 1286640 C | 11/2006 |
| CN | 1898341 A | 1/2007 |
| CN | 1934140 A | 3/2007 |
| CN | 101701129 A | 5/2010 |
| CN | 102105515 A | 6/2011 |
| CN | 102257087 A | 11/2011 |
| EP | 0323560 A2 | 7/1989 |
| EP | 0442305 A2 | 8/1991 |
| EP | 0699704 A1 | 3/1996 |
| EP | 1162246 A1 | 12/2001 |
| EP | 2 840 109 A1 | 2/2015 |
| EP | 2 840 110 A1 | 2/2015 |
| EP | 2840107 A1 | 2/2015 |
| EP | 2 842 989 A1 | 3/2015 |
| EP | 2843008 A1 | 3/2015 |
| EP | 2857440 A1 | 4/2015 |
| JP | 10-036540 A | 2/1998 |
| JP | H11-333370 A | 12/1999 |
| JP | 2000-015734 A | 1/2000 |
| JP | 2000-071392 A | 3/2000 |
| JP | 2000-103887 A | 4/2000 |
| JP | 2000-214791 A | 8/2000 |
| JP | 2000-286179 A | 10/2000 |
| JP | 2000-293895 A | 10/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-343119 A | 12/2005 |
| JP | 2006-051781 A | 2/2006 |
| JP | 2007-145965 A | 6/2007 |
| JP | 2007-262281 A | 10/2007 |
| JP | 2007-313872 A | 12/2007 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008-116596 A | 5/2008 |
| JP | 2008-138165 A | 6/2008 |
| JP | 2008-150484 A | 7/2008 |
| JP | 2008-156387 A | 7/2008 |
| JP | 2008-165041 A | 7/2008 |
| JP | 2008-310286 A | 12/2008 |
| JP | 2009-025808 A | 2/2009 |
| JP | 2009-204725 A | 9/2009 |
| JP | 2009-204727 A | 9/2009 |
| JP | 2009-241458 A | 10/2009 |
| JP | 2009-255565 A | 11/2009 |
| JP | 2010-001431 A | 1/2010 |
| JP | 2010-017991 A | 1/2010 |
| JP | 2010-023507 A | 2/2010 |
| JP | 2010-024449 A | 2/2010 |
| JP | 2010-024450 A | 2/2010 |
| JP | 2010-052334 A | 3/2010 |
| JP | 2010-053231 A | 3/2010 |
| JP | 2010-085985 A | 4/2010 |
| JP | 2010-121013 A | 6/2010 |
| JP | 4496424 B2 | 7/2010 |
| JP | 2010-173234 A | 8/2010 |
| JP | 2010-284910 A | 12/2010 |
| JP | 2011-022456 A | 2/2011 |
| JP | 2011-031457 A | 2/2011 |
| JP | 2011-031527 A | 2/2011 |
| JP | 2011-504828 A | 2/2011 |
| JP | 2011-505452 A | 2/2011 |
| JP | 2011-046917 A | 3/2011 |
| JP | 2011-075705 A | 4/2011 |
| JP | 2011-093290 A | 5/2011 |
| JP | 2011-126160 A | 6/2011 |
| JP | 2011-126164 A | 6/2011 |
| JP | 2011-126165 A | 6/2011 |
| JP | 2011-145593 A | 7/2011 |
| JP | 2011-148181 A | 8/2011 |
| JP | 2011-148301 A | 8/2011 |
| JP | 2011-523370 A | 8/2011 |
| JP | 2011-178910 A | 9/2011 |
| JP | 2011-183561 A | 9/2011 |
| JP | 2011-201087 A | 10/2011 |
| JP | 2011-225846 A | 11/2011 |
| JP | 2011-246548 A | 12/2011 |
| JP | 2012-027190 A | 2/2012 |
| JP | 2012-027401 A | 2/2012 |
| JP | 2012-051118 A | 3/2012 |
| JP | 2012-063577 A | 3/2012 |
| JP | 2012-066477 A | 4/2012 |
| JP | 2012-072235 A | 4/2012 |
| JP | 4911474 B2 | 4/2012 |
| JP | 2012-518713 A | 8/2012 |
| JP | 2012-206262 A | 10/2012 |
| JP | 2013-095108 A | 5/2013 |
| KR | 10-1998-0020031 A | 3/1999 |
| KR | 10-1999-0072670 A | 9/1999 |
| KR | 10-2000-0021805 A | 4/2000 |
| KR | 10-2000-0021806 A | 4/2000 |
| KR | 10-2002-0008267 A | 1/2002 |
| KR | 10-0867338 B1 | 9/2002 |
| KR | 10-2004-0037081 A | 5/2004 |
| KR | 10-2004-0076422 A | 9/2004 |
| KR | 10-2004-0083916 A | 10/2004 |
| KR | 10-2004-0097189 A | 11/2004 |
| KR | 10-2006-0009194 A | 1/2006 |
| KR | 10-2007-0039742 A | 4/2007 |
| KR | 10-0730414 B1 | 6/2007 |
| KR | 10-0735894 B1 | 6/2007 |
| KR | 10-2007-0098560 A | 10/2007 |
| KR | 10-2007-0111352 A | 11/2007 |
| KR | 10-2008-0005839 A | 1/2008 |
| KR | 10-2008-0055698 A | 6/2008 |
| KR | 10-0852562 B1 | 8/2008 |
| KR | 10-2008-0109658 A | 12/2008 |
| KR | 10-2009-0020106 A | 2/2009 |
| KR | 10-0884079 B1 | 2/2009 |
| KR | 10-2009-0044089 A | 5/2009 |
| KR | 10-2009-0061821 A | 6/2009 |
| KR | 10-2009-0063182 A | 6/2009 |
| KR | 10-0905683 B1 | 6/2009 |
| KR | 10-2009-0073668 A | 7/2009 |
| KR | 10-0926220 B1 | 11/2009 |
| KR | 10-2010-0019661 A | 2/2010 |
| KR | 10-0945063 B1 | 2/2010 |

(56) References Cited

FOREIGN PATENT DOCUMENTS

| KR | 10-2010-0026012 A | 3/2010 |
|---|---|---|
| KR | 10-2010-0026014 A | 3/2010 |
| KR | 10-2010-0037519 A | 4/2010 |
| KR | 10-2010-0041992 A | 4/2010 |
| KR | 10-2010-0045997 A | 5/2010 |
| KR | 10-2010-0055160 A | 5/2010 |
| KR | 10-2010-0077798 A | 7/2010 |
| KR | 10-2010-0098320 A | 9/2010 |
| KR | 10-2010-0121281 A | 11/2010 |
| KR | 10-2010-0124477 A | 11/2010 |
| KR | 10-2010-0129512 A | 12/2010 |
| KR | 10-2010-0130367 A | 12/2010 |
| KR | 10-2010-0132786 A | 12/2010 |
| KR | 10-2011-0034324 A | 4/2011 |
| KR | 10-2011-0037622 A | 4/2011 |
| KR | 10-2011-0047596 A | 5/2011 |
| KR | 10-2011-0058743 A | 6/2011 |
| KR | 10-2011-0071480 A | 6/2011 |
| KR | 10-1058395 B1 | 8/2011 |
| KR | 10-2011-0103885 A | 9/2011 |
| KR | 10-2011-0104663 A | 9/2011 |
| KR | 10-2011-0130142 A | 12/2011 |
| KR | 10-1093721 B1 | 12/2011 |
| KR | 10-2012-0002366 A | 1/2012 |
| KR | 10-1127952 B1 | 3/2012 |
| KR | 10-1150719 B1 | 6/2012 |
| KR | 10-1168073 B1 | 7/2012 |
| KR | 10-2012-0136597 A | 12/2012 |
| KR | 10-1295325 B1 | 8/2013 |
| TW | 200907401 A | 2/2009 |
| TW | 201041985 A | 12/2010 |
| TW | 201105694 A | 2/2011 |
| TW | 201130880 A | 9/2011 |
| TW | 201202403 A | 1/2012 |
| TW | I357922 B | 2/2012 |
| WO | 2007-081186 A1 | 7/2007 |
| WO | 2007-121102 A1 | 10/2007 |
| WO | WO 2008-098872 A1 | 8/2008 |
| WO | 2009-050957 A1 | 4/2009 |
| WO | 2010-035764 A1 | 4/2010 |
| WO | 2011-013611 A | 2/2011 |
| WO | 2011/105532 A1 | 9/2011 |
| WO | 2012-026475 A1 | 3/2012 |
| WO | 2012/060145 A1 | 5/2012 |
| WO | 2012-066743 A1 | 5/2012 |
| WO | 2013/105656 A1 | 7/2013 |

OTHER PUBLICATIONS

Extended European Search Report dated Mar. 15, 2016, issued in European Patent Application No. 13830681.6, 10 pages.
Extended European Search Report dated Apr. 4, 2016, issued in European Patent Application No. 13830724.4, 11 pages.
Extended European Search Report dated Apr. 6, 2016, issued in European Patent Application No. 13831327.5, 8 pages.
Extended European Search Report dated Dec. 17, 2015, issued in European Patent Application No. 13797819.3, 12 pages.
Extended European Search Report dated Dec. 17, 2015, issued in European Patent Application No. 13797572.8, 10 pages.
Extended European Search Report dated Jan. 8, 2016, issued in European Patent Application No. 13796271.8, 7 pages.
Extended European Search Report dated Jan. 29, 2016, issued in European Patent Application No. 13830624.6, 9 pages.
Extended European Search Report dated Dec. 22, 2015, issued in European Patent Application No. 13798019.9, 9 pages.
Extended European Search Report dated Jan. 8, 2016, issued in European Patent Application No. 13798121.3, 6 pages.
Extended European Search Report dated Jan. 8, 2016, issued in European Patent Application No. 13798100.7, 7 pages.
Shin-Nakamura Chemical Co., Ltd.; (2009); Product list; Retrieved from http://www.shin-nakamura.com/products/monomer-oligomer-07.html (2 pages).
Ciba TINUVIN 900 Light Stabilizer, Ciba Specialty Chemicals, 1997, pp. 1-3.

* cited by examiner

HARD COATING FILM

CROSS REFERENCE TO RELATED APPLICATIONS

This application is a 35 U.S.C. § 371 National Phase Entry Application from PCT/KR2013/004804, filed May 31, 2013, and designating the United States, which claims priority under 35 U.S.C. § 119 to Korean Patent Application No. 10-2012-0058634, filed on May 31, 2012, Korean Patent Application No. 10-2012-0058635, filed on May 31, 2012, Korean Patent Application No. 10-2012-0058636, filed on May 31, 2012, Korean Patent Application No. 10-2012-0058637, filed on May 31, 2012, and to Korean Patent Application No. 10-2013-0062124, filed on May 30, 2013, which are incorporated herein by reference in their entireties.

TECHNICAL FIELD

The present invention relates to a hard coating film. More particularly, the present invention relates to a hard coating film having high hardness and excellent properties.

This application claims the benefits of Korean Patent Application Nos. 10-2012-0058634, filed on May 31, 2012, 10-2012-0058635, filed on May 31, 2012, 10-2012-0058636, filed on May 31, 2012, 10-2012-0058637, filed on May 31, 2012, and 10-2013-0062124, filed on May 30, 2013. The entire disclosures of the prior applications are hereby incorporated by references herein in its entirety into this application.

BACKGROUND ART

Recently, with the advance of mobile appliances such as smart phones, tablet PCs and the like, substrates for displays have been required to become thin or slim. Display windows or front panels of such mobile appliances are generally made of glass or reinforced glass which is a material having excellent mechanical properties. However, glass materials suffer from the disadvantage of making the mobile appliances heavy due to their own weight and being apt to be broken by external impacts.

As an alternative to glass, plastic resin films have been researched. A plastic resin film is suitable for the trend of pursuing lighter and slimmer mobile appliances because it is lightweight and does not easily break. Particularly, a film with high hardness and wear resistance is required. In this regard, it is proposed to have a structure in which the substrate is coated with a hard coating layer.

As a method of improving the surface hardness of a hard coating layer, a method of increasing the thickness of the hard coating layer may be considered. In order to ensure the surface hardness of the hard coating layer to such a degree that glass can be replaced by the hard coating layer, it is necessary to adjust the thickness of the hard coating layer. However, as the thickness of the hard coating layer increases, the surface hardness thereof may become higher, whereas the hard coating layer may be wrinkled or curled due to the curing shrinkage thereof and may be easily cracked or exfoliated. Therefore, it is not easy to put the hard coating layer to practical use.

Recently, there haven been proposed several methods of increasing the hardness of a hard coating film and solving the problem of the hard coating film being cracked or curled by the curing shrinkage thereof.

Korean Patent Application Publication No. 2010-0041992 discloses a hard coating film composition, free of monomers, using a binder resin including ultraviolet-curable polyurethane acrylate oligomers. However, this hard coating film has a pencil hardness of about 3 H, which is not sufficient to alternate glass panels for displays.

DISCLOSURE

Technical Problem

Accordingly, the present invention has been devised to solve the above-mentioned problems, and an object of the present invention is to provide a hard coating film having high hardness, which is not curled, warped or cracked.

Technical Solution

In order to accomplish the above object, an aspect of the present invention provides a hard coating film, including: a supporting substrate; and a hard coating layer formed on at least one side of the supporting substrate, wherein the hard coating layer includes a photocurable crosslinked copolymer of tri- to hexa-functional acrylate-based monomers, and inorganic particles dispersed in the photocurable crosslinked copolymer.

Advantageous Effects

As described above, the hard coating film of the present invention exhibits excellent properties in terms of hardness, scratch resistance, and transparency. In addition, it is of high workability and thus is much less prone to curling and cracking. Therefore, this hard coating film can be usefully applied to front panels or display panels of mobile appliances, display devices, instruments and the like.

BEST MODE FOR CARRYING OUT THE INVENTION

In accordance with an aspect thereof, the present invention provides a hard coating film including: a supporting substrate; and a hard coating layer formed on at least one side of the supporting substrate, wherein the hard coating layer includes a photocurable crosslinked copolymer of tri- to hexa-functional acrylate-based monomers, and inorganic particles dispersed in the photocurable crosslinked copolymer.

In the present invention, the terms "first", "second" and the like are used to describe various constituents, only for the purpose of differentiating one constituent from another.

Further, the terms used in the present specification are used only to illustrate the present invention, and do not intend to limit the present invention. The singular number includes the plural number as long as they are apparently different from each other in context. In the present specification, the terms "include", "comprise", "have" and the like designate the existence of features, steps, constituents and combinations thereof, and must be understood that existence or addition of one or more other features, steps, constituents and combinations thereof is not previously excluded.

Further, in the present invention, when it is mentioned that each constituent is formed "on", "over" or "above" each constituent, it means that each constituent is directly formed on each constituent or that another constituent is additionally formed between layers, on an object or on a substrate.

Since the present invention may be modified in various forms, preferred embodiments of the present invention will be described in detail. Although these embodiments have been disclosed for illustrative purposes, it will be appreciated that the present invention is not limited thereto, and those skilled in the art will appreciate that various modifications, additions and substitutions are possible, without departing from the scope and spirit of the invention.

Hereinafter, preferred embodiments of the present invention will be described in detail.

A hard coating film according to an embodiment of the present invention includes: a supporting substrate; a hard coating layer formed on at least one side of the supporting substrate, wherein the hard coating layer includes a photocurable crosslinked copolymer of tri- to hexa-functional acrylate-based monomers, and inorganic particles dispersed in the photocurable crosslinked copolymer.

In the hard coating film of the present invention, so long as it is transparent, any plastic resin, whether capable of being stretched or not, may be used for the supporting substrate which the hard coating layer will be formed on, without limitations imposed thereto. According to an embodiment of the present invention, the supporting substrate may include polyethyleneterephtalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) or the like. The supporting substrate may be a single layer structure, and, if necessary, may be a multilayer structure composed of the same or different materials, but is not particularly limited.

According to an embodiment of the present invention, the supporting substrate may be a multilayered substrate made of polyethyleneterephthalate (PET) or may be a multilayered substrate formed by the coextrusion of polymethylmethacrylate (PMMA) and polycarbonate (PC).

Further, according to an embodiment of the present invention, the supporting substrate may include a copolymer of polymethylmethacrylate (PMMA) and polycarbonate (PC).

The thickness of the supporting substrate may be, but is not limited to, about 30 to about 1,200 μm, or about 50 to about 800 μm.

In the hard coating film of the present invention, the hard coating layer is formed on at least one side of the supporting substrate.

Further, according to an embodiment of the present invention, the thickness ratio of the supporting substrate to the hard coating layer may be about 1:0.5 to about 1:2, or about 1:0.5 to about 1:1.5. When the thickness ratio thereof is present in the above range, a hard coating film, which exhibits high hardness and which is not easily curled or cracked, may be formed.

In the hard coating film of the present invention, the hard coating layer includes a photocurable crosslinked copolymer of tri- to hexa-functional acrylate-based monomers, and inorganic particles dispersed in the photocurable crosslinked copolymer.

In the present specification, the term "acrylate-based" is intended to encompass acrylate, methacrylate, and derivatives thereof with various substituents.

Examples of the tri- to hexa-functional acrylate-based monomers may include trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. The tri- to hexa-functional acrylate-based monomers may be used independently or in a combination thereof.

According to an embodiment of the present invention, the photocurable crosslinked copolymer may be a copolymer in which the tri- to hexa-functional acrylate-based monomers are crosslink-polymerized with each other.

According to another embodiment of the present invention, the photocurable crosslinked copolymer may be a copolymer in which the tri- to hexa-functional acrylate-based monomers are crosslink-polymerized with mono- to di-functional acrylate-based monomers.

Examples of the mono- to di-functional acrylate-based monomers may include hydroxyethyl acrylate (HEA), hydroxyethyl methacrylate (HEMA), hexanediol diacrylate (HDDA), tripropyleneglycol diacrylate (TPGDA), ethyleneglycol diacrylate (EGDA), and the like. The mono- to di-functional acrylate-based monomers may also be used independently or in a combination thereof.

When the photocurable crosslinked copolymer is a copolymer in which mono- to di-functional acrylate-based monomers are crosslink-polymerized with tri- to hexa-functional acrylate-based monomers, the content ratio of the mono- to di-functional acrylate-based monomers to the tri- to hexa-functional acrylate-based monomers is not particularly limited. According to an embodiment of the present invention, mono- to di-functional acrylate-based monomers and tri- to hexa-functional acrylate-based monomers may be included such that the weight ratio thereof may be about 1:99 to about 50:50, about 10:90 to about 50:50, or about 20:80 to about 40:60. When mono- to di-functional acrylate-based monomers and tri- to hexa-functional acrylate-based monomers are included at the above weight ratio, the hard coating layer may be imparted with high hardness and flexibility without deteriorating other physical properties such as curl characteristics, light resistance and the like.

Further, in the hard coating film of the present invention, the hard coating layer includes inorganic mircoparticles dispersed in the photocurable crosslinked copolymer.

According to an embodiment of the present invention, as the inorganic particles, inorganic nanoparticles having a particle size of about 100 nm or less, about 10 to about 100 nm, or about 10 to about 50 nm may be used. For example, silica particles, aluminum oxide particles, titanium oxide particles or zinc oxide particles may be used as the inorganic particles.

The inorganic particles included in the hard coating composition make an additional contribution to improving the hardness of the hard coating film.

According to an embodiment of the present invention, the hard coating layer may include about 40 to about 90 parts by weight of a photocurable crosslinked copolymer and about 10 to about 60 parts by weight of inorganic particles based on 100 parts by weight of the hard coating layer, or may include about 50 to about 80 parts by weight of a photocurable crosslinked copolymer and about 20 to about 50 parts by weight of inorganic particles based on 100 parts by weight of the hard coating layer. The hard coating layer includes the photocurable crosslinked copolymer and the inorganic particles in the above ranges, thus forming a hard coating film having excellent physical properties.

Further, according to an embodiment of the present invention, when the hard coating layer is halved in a direction perpendicular to the supporting substrate, a larger amount of the inorganic particles may be distributed in the halved hard coating layer adjacent to the surface of the hard coating layer compared to in the halved hard coating layer adjacent to the surface of the supporting substrate.

Meanwhile, the hard coating layer may further include commonly-used additives such as a surfactant, a yellowing inhibitor, a leveling agent, an antifouling agent and the like in addition to the above-mentioned photocurable crosslinked copolymer and inorganic particles. Here, the content of the additive is not particularly limited because the content thereof may be variously adjusted as long as the physical properties of the hard coating film of the present invention are not deteriorated. For example, the additive may be included in an amount of about 0.1 to about 10 parts by weight based on 100 parts by weight of the photocurable crosslinked copolymer.

According to an embodiment of the present invention, for example, the hard coating layer may include a surfactant as an additive. The surfactant may be a mono- to di-functional fluorine-based acrylate, a fluorine-based surfactant or a silicon-based surfactant. In this case, the surfactant may be included in the form of it being dispersed in or crosslinked with the photocurable crosslinked copolymer.

Further, the hard coating layer may include a yellowing inhibitor as the additive. The yellowing inhibitor may be a benzophenone compound, a benzotriazole compound or the like.

The hard coating layer may be formed by photocuring a hard coating composition including a binder containing the tri- to hexa-functional acrylate-based monomers, inorganic particles, a photoinitiator and, if necessary, an additive.

Examples of the photoinitiator may include, but are not limited to, 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-l-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphophine oxide, and the like. Further, examples of commercially available photoinitiators may include Irgacure 184, Irgacure 500, Irgacure 651, Irgacure 369, Irgacure 907, Darocur 1173, Darocur MBF, Irgacure 819, Darocur TPO, Irgacure 907, Esacure KIP 100F, and the like. These photoinitiators may be used independently or in a mixture thereof.

Further, in order to adjust the viscosity and fluidity of the hard coating composition and improve the coatability of the hard coating composition to the supporting substrate, the hard coating layer may be formed by applying a hard coating composition further including an organic solvent onto the supporting substrate.

Examples of the organic solvent may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglyco monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used independently or in a mixture thereof.

In the hard coating film of the present invention, when the hard coating composition including the organic solvent is applied onto the supporting substrate, the organic solvent may be included in the hard coating composition such that the weight ratio of the organic solvent to the solid content including the binder, first inorganic particles, photoinitiator and additive is about 70:30 to about 99:1.

According to an embodiment of the present invention, the hard coating film of the present invention may be obtained by applying the hard coating composition including the above-mentioned components onto at least one side of the supporting substrate and then photocuring this hard coating composition to form a hard coating layer.

The completely-cured hard coating layer may have a thickness of about 50 μm or more, for example, about 50 to about 150 μm or about 70 to about 100 μm. According to the present invention, a high-hardness hard coating film, which is not curled or cracked although it includes the above-mentioned hard coating layer, may be provided.

According to an embodiment of the present invention, the hard coating layer may be formed on only one side of the supporting substrate.

According to another embodiment of the present invention, the hard coating layer may be formed on both sides of the supporting substrate.

According to an embodiment of the present invention, The hard coating film of the present invention may further include at least one layer or film selected from the group consisting of a plastic resin film, an adhesive film, a release film, a conductive film, a conductive layer, a coating layer, a cured resin layer, a nonconductive film, a metal mesh layer and a patterned metal layer, each of which is formed on at least one side of the hard coating layer. The layer or film may be a single layer, a double layer, a laminate or the like. The layer or film may be formed on the hard coating layer by lamination, coating, deposition, sputtering or the like using an adhesive or an adhesive film, but is not limited thereto.

When the hard coating layer is formed on both sides of the supporting substrate, the hard coating composition may be sequentially applied onto front and back sides of the supporting substrate, or may be simultaneously applied onto both sides of the supporting substrate.

When the hard coating layer is formed on both sides of the supporting substrate, the hard coating layer may formed by the following method.

According to an embodiment of the present invention, the hard coating film of the present invention may be formed by a two-step process including the steps of: 1) applying a first hard coating composition onto one side of the supporting substrate and then photocuring the first hard coating composition; and 2) applying a second hard coating composition onto the other side of the supporting substrate and then photocuring the second hard coating composition. In this case, each of the first and second hard coating compositions is the same as the above-mentioned hard coating composition, and these first and second hard coating compositions are applied onto one side and the other side of the supporting substrate, respectively.

In the step 2), since ultraviolet is radiated to a side opposite to the side on which the first hard coating composition applied, the curl caused by the curing and shrinkage of the first hard coating composition in the step 1) is set off in a direction opposite thereto, thus obtaining a flat hard coating film. Therefore, an additional flattening procedure is not needed.

According to an embodiment of the present invention, when the hard coating film is exposed to a temperature of 50° C. or more and a humidity of 80% or more for 70 hours or more and then placed on a plane, the maximum distance at which each edge of the hard coating film is spaced apart from the plane may be about 1.0 mm or less, about 0.6 mm or less, or about 0.3 mm or less. More specifically, when the hard coating film is exposed to a temperature of 50 to 90° C. and a humidity of 80 to 90% for 70 to 100 hours or more and then placed on a plane, the maximum distance at which each edge of the hard coating film is spaced apart from the plane may be about 1.0 mm or less, about 0.6 mm or less, or about 0.3 mm or less.

The hard coating film of the present invention can be usefully used in various fields because it has high hardness, scratch resistance, transparency, durability, light resistance, light transmittance and the like.

For example, the hard coating film of the present invention may have a pencil hardness of 7 H or more, 8 H or more or 9 H or more under a load of 1 kg.

Further, when a friction tester is mounted with a steel wool #0000 and then the steel wool #0000 is reciprocated on the hard coating film of the present invention 400 times under a load of 500 g, two or less scratches may be formed on the hard coating film.

Further, the hard coating film of the present invention may have a light transmittance of 91% or more, or 92.0% or more, and a haze of 1.0% or less, 0.5% or less, or 0.4% or less.

Further, the hard coating film of the present invention may have an initial color b* value of 1.0 or less. Further, when the hard coating film is exposed to UV-B for 72 hours or more by an ultraviolet lamp, the difference between the initial color b* value of the hard coating film and the color b* value of the hard coating film exposed to UV-B may be 0.5 or less or 0.4 or less.

As described above, the hard coating film of the present invention can be used in various fields. For example, the hard coating film of the present invention can be used in touch panels of mobile terminals, smart phones or tablet PCs and covers of displays or devices.

Hereinafter, the present invention will be described in more detail with reference to the following Examples. However, these Examples are set forth to illustrate the present invention, and the scope of the present invention is not limited thereto.

EXAMPLES

Example 1

2 g of hydroxyethylacrylate (HEA), 8 g of a silica-dipentaerythritolhexacrylate (DPHA) composite (silica 4 g, DPHA 4 g) dispersed with silica nanoparticles having a particle size of 20~30 nm in an amount of about 40 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition. A second hard coating composition was also prepared by the same method.

The first hard coating composition was applied onto one side of a PET supporting substrate having a size of 15 cm×20 cm and a thickness of 188 μm. Then, the PET supporting substrate coated with the first hard coating composition was irradiated with ultraviolet having a wavelength of 280~350 nm using a black light fluorescent lamp to photocure the first hard coating composition.

The second hard coating composition was applied onto the other side of the PET supporting substrate. Then, the PET supporting substrate coated with the second hard coating composition was irradiated with ultraviolet having a wavelength of 280~350 nm using a black light fluorescent lamp to photocure the second hard coating composition, thereby preparing a hard coating film. Here, the thickness of each of the hard coating layers formed on both sides of the PET supporting substrate was 100 μm.

Example 2

A hard coating film was prepared in the same manner as in Example 1, except that 2 g of 9-ethyleneglycol diacrylate (9-EGDA) was used instead of 2 g of hydroxyethylacrylate (HEA).

Example 3

A hard coating film was prepared in the same manner as in Example 1, except that 1 g of hydroxyethylacrylate (HEA) and 9 g of a silica-trimethylolpropanetriacrylate (TMPTA) composite (silica 4.5 g, TMPTA 4.5 g) dispersed with silica nanoparticles having a particle size of 20~30 nm in an amount of about 50 wt % were used instead of 2 g of hydroxyethylacrylate (HEA) and 8 g of a silica-dipentaerythritolhexacrylate (DPHA) composite.

Example 4

2 g of hydroxyethylacrylate (HEA), 8 g of a silica-dipentaerythritolhexacrylate (DPHA) composite (silica 3.2 g, DPHA 4.8 g) dispersed with silica nanoparticles having a particle size of 20~30 nm in an amount of about 40 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were dissolved in 2 g of methyl ethyl ketone (MEK) to prepare first and second hard coating compositions.

Each of the first and second hard coating composition was applied onto a PC/PMMA coextruded supporting substrate having a size of 15 cm×20 cm and a thickness of 188 μm. Thereafter, a hard coating film was prepared in the same manner as in Example 1.

Example 5

A hard coating film was prepared in the same manner as in Example 1, except that a TAC resin supporting substrate having a size of 15 cm×20 cm and a thickness of 80 μm was used as a supporting substrate.

Comparative Example 1

A hard coating film was prepared in the same manner as in Example 1, except that only 10 g of dipentaerythritolhexacrylate (DPHA) was used instead of hydroxyethylacrylate (HEA) and a silica-dipentaerythritolhexacrylate (DPHA) composite.

Comparative Examples 2 and 3

Hard coating films were prepared in the same manner as in Example 1, except that the components of first and second hard coating compositions were adjusted as given in Table 1 below.

Main components and supporting substrates of Examples 1 to 5 and Comparative Examples 1 to 4 are summarized in Table 1 below.

TABLE 1

| No. | Monomers for binder | | Supporting substrate | Inorganic particles (unit: g) |
|---|---|---|---|---|
| | 3-6 functional acrylate | 1-2 functional acrylate | | |
| Ex. 1 | DPHA 4.8 g | HEA 2 g | PET | 3.2 |
| Ex. 2 | DPHA 4.8 g | 9-EGDA 2 g | PET | 3.2 |
| Ex. 3 | TMPTA 4.5 g | HEA 1 g | PET | 4.5 |
| Ex. 4 | DPHA 4.8 g | HEA 2 g | PC/PMMA | 3.2 |
| Ex. 5 | DPHA 4.8 g | HEA 2 g | TAC | 3.2 |
| Comp. Ex. 1 | DPHA 10 g | 0 | PET | 0 |
| Comp. Ex. 2 | DPHA 8 g | HEA 2 g | PET | 0 |
| Comp. Ex. 3 | DPHA 5 g | HEA 5 g | PET | 0 |

<Test Example>
<Measuring Method>
1) Pencil Hardness

Pencil hardness was evaluated according to the Japanese Standard JIS K5400. In this regard, a pencil hardness meter was reciprocated three times on each of the hard coating film under a load of 1.0 kg to determine the hardness at which no scratches were observed.

2) Scratch Resistance

After being loaded to a friction tester, a steel wool (#0000) was reciprocated 400 times on each of the hard coating films under a load of 0.5 kg, and scratches thus formed were counted. Evaluation was made of the scratch resistance of the films by marking O for two or less scratches, Δ for two to less than five scratches, and x for five or more scratches.

3) Light Resistance

Differences in color b* value of the hard coating films were measured before and after exposure to UVB from UV lamp for 72 hours.

4) Transmittance and Haze

The transmittance and haze of the hard coating films were measured using a spectrophotometer (brand name: COH-400).

5) Curl Property to Temperature and Humidity

When each of the hard coating films was cut to a size of 10 cm×10 cm, stored in a chamber at a temperature of 85° C. and a humidity of 85% for 72 hours and then placed on a plane, the maximum distance at which each edge of the hard coating film was spaced apart the plane was measured.

6) Cylindrical Bending Test

Each of the hard coating films was wound on a cylindrical mandrel having a diameter of 3 cm, and then it was determined whether or not each of the hard coating film was cracked. IF each of the hard coating films was not cracked, it was evaluated as OK, and if it was cracked, it was evaluated as X.

7) Impact Resistance

The impact resistance of each of the hard coating films was evaluated by determining whether or not each of the hard coating films was cracked when a 22 g steel ball was dropped thereon from a height of 40 cm. When each of the hard coating films was not cracked, it is indicated by OK, and when it was cracked, it is indicated by X.

The results of the physical properties measured in the hard coating films are summarized in Table 2 below.

TABLE 2

| | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Pencil hardness | 8H | 9H | 9H | 8H | 8H | 6H | 5H | 3H |
| Scratch resistance | ◯ | ◯ | ◯ | ◯ | ◯ | ◯ | Δ | X |
| Light resistance | 0.20 | 0.22 | 0.15 | 0.20 | 0.20 | 0.25 | 0.21 | 0.16 |
| Transmittance | 92.2 | 92.3 | 92.4 | 92.5 | 92.3 | 92.0 | 91.7 | 92.1 |
| Haze | 0.4 | 0.4 | 0.3 | 0.2 | 0.4 | 0.5 | 0.4 | 0.4 |
| Bending test | OK | OK | OK | OK | OK | X | OK | OK |
| Curl property | 0.3 mm | 0.2 mm | 0.2 mm | 0.3 mm | 0.3 mm | 0.5 mm | 0.4 mm | 0.3 mm |
| Impact resistance | OK | OK | OK | OK | OK | X | OK | OK |

As given in Table 2 above, it can be ascertained that all of the hard coating films of Examples 1 to 5 exhibit good physical properties.

The invention claimed is:

1. A hard coating film, comprising:
a supporting substrate; and
a hard coating layer directly formed on both sides of the supporting substrate,
wherein the hard coating layer includes a crosslinked copolymer in which tri- to hexa-functional acrylate-based monomers are crosslink-polymerized with mono- to di-functional acrylate-based monomers,
wherein the hard coating layer includes inorganic particles having a particle size of 100 nm or less dispersed in the crosslinked copolymer,
wherein the hard coating film has a hardness property of pencil hardness of 7H or more,
wherein the hard coating layer has a thickness of 50 to 150 μm, and
wherein the hard coating film has a light transmittance of 91% or more.

2. The hard coating film of claim 1, wherein the tri- to hexa-functional acrylate-based monomer includes at least one selected from the group consisting of trimethylolpropane triacrylate (TMPTA), trimethylolpropaneethoxy triacrylate (TMPEOTA), glycerin-propoxylated triacrylate (GPTA), pentaerythritol tetraacrylate (PETA), and dipentaerythritol hexaacrylate (DPHA).

3. The hard coating film of claim 1, wherein the mono- to di-functional acrylate-based monomer includes at least one selected from the group consisting of hydroxyethyl acrylate (HEA), hydroxyethyl methacrylate (HEMA), hexanediol diacrylate (HDDA), tripropyleneglycol diacrylate (TPGDA), and ethyleneglycol diacrylate (EGDA).

4. The hard coating film of claim 1, wherein the supporting substrate includes at least one selected from the group consisting of polyethyleneterephtalate (PET), a cyclic olefin copolymer (COC), polyacrylate (PAC), polyethylene (PE), polymethylmethacrylate (PMMA), polyetheretherketone (PEEK), polyethylenenaphthalate (PEN), polyetherimide (PEI), polyimide (PI), triacetylcellulose (TAC), and methyl methacrylate (MMA).

5. The hard coating film of claim 1, wherein the inorganic particles include at least one selected from the group consisting of silica nanoparticles, aluminum oxide nanoparticles, titanium oxide nanoparticles and zinc oxide nanopaticles.

6. The hard coating film of claim 1, further comprising an additive dispersed in or crosslinked with the crosslinked copolymer.

7. The hard coating film of claim 6, wherein the additive is dispersed in or crosslinked with the crosslinked copolymer, and includes at least one selected from the group consisting of a mono- to di-functional fluorine-based acrylate, a fluorine-based surfactant, and a silicon-based surfactant.

8. The hard coating film of claim 6, wherein the additive is dispersed in the crosslinked copolymer, and includes a yellowing inhibitor including a benzophenone compound or a benzotriazole compound.

9. The hard coating film of claim 1, wherein the hard coating layer includes 40 to 90 parts by weight of the crosslinked copolymer and 10 to 60 parts by weight of inorganic particles.

10. The hard coating film of claim 1, wherein the hard coating film has scratch resistance properties such that two or less scratches are formed when the surface of the hard coating layer is rubbed by reciprocating a steel wool #0000 thereon 400 times under a load of 500 g.

11. The hard coating film of claim 1, wherein the hard coating film has a haze of 0.4 or less and a b* value of 1.0 or less.

12. The hard coating film of claim 1, wherein the hard coating film has light resistance properties such that, when the hard coating film is exposed to UV-B for 72 hours, the change in b* value of the hard coating layer is 0.5 or less.

13. The hard coating film of claim 1, further comprising at least one layer selected from the group consisting of a plastic resin film, an adhesive film, a release film, a conductive film, a conductive layer, a coating layer, a cured resin layer, a nonconductive film, a metal mesh layer and a patterned metal layer, each of which is formed on the hard coating layer.

14. The hard coating film of claim 1, wherein the hard coating film has curl resistance properties such that, when the hard coating film is exposed to a temperature of 50° C. or more and a humidity of 80% or more for 70 hours or more and then placed on a plane, a maximum distance at which each edge of the hard coating film is spaced apart from the plane is 1.0 mm or less.

15. The hard coating film of claim 1, wherein a thickness ratio of the supporting substrate to the hard coating layer is 1:0.5 to 1:2.

* * * * *